United States Patent [19]
Donohue et al.

[11] Patent Number: 5,987,480
[45] Date of Patent: *Nov. 16, 1999

[54] METHOD AND SYSTEM FOR DELIVERING DOCUMENTS CUSTOMIZED FOR A PARTICULAR USER OVER THE INTERNET USING IMBEDDED DYNAMIC CONTENT

[76] Inventors: Michael Donohue, 280 Park Ave. South, #25E, New York, N.Y. 10010; Patrick Leung, 400 Broome St., Apt. 512, New York, N.Y. 10013

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,209

[22] Filed: Jul. 25, 1996

[51] Int. Cl.[6] .................................................. G06F 15/00

[52] U.S. Cl. ............................................. 707/501

[58] Field of Search ..................... 707/501, 513, 707/515, 10; 345/333, 335; 395/200.33

[56] References Cited

U.S. PATENT DOCUMENTS

| | | | |
|---|---|---|---|
| 4,750,135 | 6/1988 | Boilen ................................. | 395/200.61 |
| 5,267,155 | 11/1993 | Buchanan et al. ...................... | 707/540 |
| 5,339,392 | 8/1994 | Risberg et al. ......................... | 345/333 |
| 5,408,655 | 4/1995 | Oren et al. ............................. | 707/501 |
| 5,444,836 | 8/1995 | Hollingsworth et al. ............... | 345/435 |
| 5,576,951 | 11/1996 | Lockwood .............................. | 705/27 |
| 5,649,186 | 7/1997 | Ferguson ................................ | 707/10 |
| 5,684,951 | 11/1997 | Goodman et al. ..................... | 395/188.01 |
| 5,694,546 | 12/1997 | Reisman ................................. | 395/712 |
| 5,706,434 | 1/1998 | Kremen et al. ........................ | 395/285 |
| 5,708,780 | 1/1998 | Levergood et al. .................... | 395/200.12 |

FOREIGN PATENT DOCUMENTS

| | | |
|---|---|---|
| 0720336A2 | 7/1996 | European Pat. Off. . |
| WO96/00946 | 1/1996 | WIPO . |

OTHER PUBLICATIONS

Book'em Dan–o, http://www.worldwidemart.com/scripts/dano.shtm, Jul. 9, 1996.

Lemay, Teach Yourself Web Publishing with HTML in a Week, Sams Publishing, pp. 32–5, 50–4, 145–7, 299–305, 1995.

Lynch, Patrick J., Basic Templates for HTML Documents, http://info.med.yale.edu/caim/stylemanual/M__II__–7.HTML, Sep. 2, 1995.

*Primary Examiner*—Phu K. Nguyen
*Attorney, Agent, or Firm*—Tiberiu Weisz; Gottlieb, Rackman & Reisman, P.C.

[57] ABSTRACT

A system and method for delivering documents having dynamic content embedded over the worldwide Internet or a local internet or intranet. A data source is stored on a server computer connected to the Internet, the data source containing content in a form representing or reducible to names and corresponding values. Document templates are created by embedding dynamic tags and flow directives in markup language documents, the dynamic tags and flow directives containing one or more names of content stored in the data source. The document templates are stored on the server computer. The server computer can receive requests from client computers connected to the Internet, the requests identifying desired documents to be delivered. In response to such a request, the server computer selects one of the document templates corresponding to the desired document, populates the document template with content stored in the data source based on respective values of content corresponding to names in the dynamic tags and flow directives, and delivers the populated document to the client computer. The invention has particular application to HTML documents transferred over the World Wide Web.

17 Claims, 8 Drawing Sheets

```
<html>
<head>
<title>List Orders for @user_id@'s ACCOUNT </title>
</head>
<form method= "get" action=*/oasis/bin/listorders.dll"​>
<body>
<ahref=*/members.htm"><ing src=*/oasis/images/member.gif*
align=right border-0></a>

<font size=+2 color=#000099><b>List Orders</b></font>
<br clear=all>
<hr>
<center>

<select name = "month">
<option value = "Jan" @if month=Jan@SELECTED@end@>January
<option value = "Feb" @if month=Feb@SELECTED@end@>February
<option value = "Mar" @if month=Mar@SELECTED@end@>March
<option value = "Apr" @if month=Apr@SELECTED@end@>April
<option value = "May" @if month=May@SELECTED@end@>May
<option value = "Jun" @if month=Jun@SELECTED@end@>June
<option value = "Jul" @if month=Jul@SELECTED@end@>July
<option value = "Aug" @if month=Aug@SELECTED@end@>August
<option value = "Sep" @if month=Sep@SELECTED@end@>September
<option value = "Oct" @if month=Oct@SELECTED@end@>October
<option value = "Nov" @if month=Nov@SELECTED@end@>November
<option value = "Dec" @if month=Dec@SELECTED@end@>December
</select>
<select name = "year">
<option>1996
</select>
<input type=submit value="View Month">
<hr>
@if aOrder_Date@00

<table width=50% cellspacing=0 cellpadding=0>
<tr>
<th align-left>Order Date</th>
<th align=right>Total</th>
</tr>

@loop@
<tr>
<td align=left>
<a href=*/oasis/bin/orderDetal.dll?Orderid+@aOrder_Id@*>
<font size= -1>@aOrder_Date@</font></td>
</a>
</td>
<td align=right><font size= -1>$@aTotal_Due@</font></td>
</tr>

@/loop@
</table>
@end@
</form>
</body>
</html>
```

FIG. 2

METHOD AND SYSTEM FOR DELIVERING DOCUMENTS CUSTOMIZED FOR A PARTICULAR USER OVER THE INTERNET USING IMBEDDED DYNAMIC CONTENT

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

This invention relates generally to a method and system for producing and delivering documents having embedded dynamic content. More particularly, the present invention relates to a method and system for producing world wide web page document templates by embedding dynamic tags and flow directives therein, populating the document templates with content stored in a data source, and delivering the populated documents over the Internet to clients requesting them.

The last few years has seen a rapid increase in usage of the worldwide network known as the Internet. This increase is particularly significant in the commercial arena. More and more businesses are recognizing the commercial potential for marketing, selling, and distributing products and services on-line, posting employment opportunities, and providing general corporate information and technical and product support. The bulk of this increased activity is taking place on the World Wide Web ("WWW" or "web"), a resource discovery tool for connecting documents or pages stored on networked computers by virtue of hypertext links. Although the architecture and operation of the web will be briefly summarized below, many resources are available for further background information on the Internet and the web, including December, J. and Randall, N., *The World Wide Web Unleashed* (Sams.net Publishing 1995) and Stanek, W. R., *Web Publishing Unleashed* (Sams.net Publishing, 1996).

Web documents are stored on web servers and are provided to client computers over the Internet upon receipt at the web server of a request for the document in the form of a uniform or universal resource locator ("URL"). The URL specifies the communications protocol by which the information is to be transferred and the Internet address of the host or web server upon which the document is stored. The URL may also specify a directory path and file name for the document. The communications protocol for the web is the hypertext transfer protocol ("HTTP"). Other communication protocols for other Internet communication tools include the file transfer protocol or FTP, Gopher, news for the Usenet, telnet, and mailto for electronic mail.

Documents or pages stored on web servers and available over the web are generally formatted in a markup language. Markup language web documents contain text and a number of tags which provide instructions as to how the text should be displayed (e.g., character and paragraph formatting, tables, forms, etc.), which text should be hyperlinked to other parts of the document or other documents, and where other types of content, including graphics and other images, video and audio segments, application programs or applets, image maps, and icons, should be retrieved from and displayed in the document.

One of the most commonly used standardized markup languages is the Hypertext Markup Language ("HTML"), currently available in several versions. Other standardized markup languages include the Standard Generalized Markup Language ("SGML") and Virtual Reality Modeling Language ("VRML"). Some markup languages, such as page definition languages, mark up web documents using a generally proprietary format which is specific to a particular commercial page display application program.

After a web page is transmitted from the web server to a client computer, a program referred to as a browser operates on the client's computer to interpret the tags and perform the formatting and other operations specified in the tags to display the text and other content in the document on the client computer's display. Many types of browser programs are available, including several variations of Mosaic, Netscape Communications Corporation's Netscape Navigator, Microsoft Corporation's Internet Explorer, TradeWave Galaxy's MacWeb, and Oracle's PowerBrowser, to name just a few. Different browsers and different versions of the same browser provide varying functionality in reading and displaying web pages and are operable on a wide variety of different platforms.

Because of the huge and ever increasing number of available web sites (which refers generally to the main or home page and ancillary or sub pages) competing for users' attention, companies recognize the importance of having well designed web sites which are informative, attractive, and user friendly. Much paper and electronic literature has been devoted to explaining techniques and styles for developing good web sites, and companies invest much time, money and effort to develop good, competitive web sites.

Despite its advances in recent years, several problems persist with the web and the Internet in general which may inhibit its continued growth as a useful commercial tool. One such problem is the lack of personalized attention in web sites to users and their specific needs and interests. For example, users accessing a merchant's web site all receive the same catalog displaying the same products at the same prices. However, users have their own particular interests and reasons for accessing a given web site. Because of the substantial time involved for users to download and review documents, users would prefer not to download an entire catalog in order to receive limited information of interest. For example, a user owning a IBM compatible personal computer would prefer not to have to download information regarding Apple compatible computers.

Conversely, in real world settings merchants prefer to enter into direct, one-to-one relationships with customers, and marketing which is more directed and focused towards each customer's interest is generally more effective and results in more sales. However, the almost anonymous nature of the web makes it difficult for merchants to establish that type of relationship on-line. Also, merchants frequently offer price discounts or special prices to certain customers, and otherwise provide individualized responses to customer's requests for assistance and information. Again, the web environment makes it difficult for merchants to offer such individualized attention to their customers.

A related problem is that the multiplicity of types of markup languages and, more significantly, types of browsers makes it difficult for web site developers to develop web pages that are compatible with all conceivable browsers users may be operating. This is particularly true for web pages employing enhanced features which are otherwise desirable to remain competitive and to show users that the web host is on the cutting edge. As a result, web pages often contain statements informing users that their web sites may only or may best be accessed with a given version of a given browser or may not be accessible with particular browsers. Alternatively, web pages contain hyperlinked lists of browsers which are supported by the web server, and users select one of the browsers on the list to hyperlink to a page which supports their selected browser. This adds time and inconvenience to the process of browsing the web and frequently annoys users.

Thus, a methodology is needed for providing web pages to users which are customized and individualized to each user's particular needs and interests. Preferably, this should be done in a manner which is transparent to the user, which does not require the user to search through and download multiple documents, and which does not require the web site developer to design and store a large number of web pages. The present invention provides such a methodology and solves these and other problems associated with the web to help make the web a more effective commercial tool.

SUMMARY OF THE INVENTION

It is an object of the present invention to solve the problems described above associated with use of the web as a commercial tool.

It is another object of the present invention to allow merchants and other web site developers to create a one-on-one relationship over the Internet with their customers and other users.

It is another object of the present invention to allow merchants to create a customized, efficient sales environment in order to maximize online sales and to provide an efficient and cost-effective shopping experience for users.

It is another object of the present invention to provide the ability to embed dynamic content into web pages.

It is another object of the present invention to provide a tool for developing markup language document templates.

It is another object of the present invention to avoid the need to develop and store multiple document templates to display hierarchically related content.

It is another object of the present invention to provide customized web pages to users in a manner which is transparent to the users.

It is another object of the present invention to automatically provide web pages to users which are compatible with the specific type and/or version of the browser being used by the user.

Some or all of the above and other objects of the present invention are achieved by a method for delivering a document having dynamic content embedded therein from a first computer to a second computer. The method comprises the steps of storing a data source containing first content in a form representing or reducible to a plurality of names and corresponding values and storing on the first computer at least one document template having second content arranged therein and a plurality of markers embedded therein. The markers can include one or more dynamic content tags each including at least one first content name. The markers can also include one or more dynamic flow directives each including one or more instructions and one or more first content names as arguments for the instructions.

When a request issued by the second computer for the document is received at the first computer, at least some of the first content is retrieved from the data source and the document template is populated to produce the document by substituting values corresponding to content names in the dynamic content tag(s) or performing the instruction(s) based on the content name(s) contained in the dynamic flow directive(s) or their corresponding value(s). The populated template is the document which is then delivered to the second computer in response to the request.

The present invention may be applied in the context of any type of networking environment, including internets (including local internets and the worldwide Internet) and corporate or organizational intranets. When applied to the world wide web on the Internet, the first computer is a web server and the second computer is a client computer. In this context, the document is a markup language web page such as a HTML document which is processed by a browser program operating on the client computer. The present invention thus provides the ability for a web server to deliver web pages containing customized content.

In preferred embodiments, the customized content is provided based on the identity of the user operating the client computer so that the document is individualized to the user's interests and needs. The method then further involves identifying the user and determining which of the first content to retrieve based on the user's identity. Web sites may provide users the ability to register at the site, and a list of registered users is then stored on the server so that the server can determine whether any identified user issuing a request for a document is on the list and is registered.

The list of registered users may further include characteristics associated with registered users, such as address information, particular interests, and the user's membership in a group or organization which receives special treatment such as discount prices. The step of determining which of the first content to retrieve would then comprise retrieving the characteristics associated with the identified user and determining which of the first content to retrieve based on the characteristics.

The markers in the template preferably contain one or more control symbols to identify them as markers. A control symbol is preferably placed before and after each marker. When used with HTML the control symbol can be the "@" symbol because it is not already used in HTML to identify HTML tags. The process of populating the document template comprises parsing the document template to locate the control symbols and thereby locate the markers.

A template parser determines the nature of each marker. For dynamic tags, the name(s) and control symbols in the tags are replaced with the value(s) corresponding to the name(s) in the data source. For flow directives, the actions specified by the instruction are performed. In preferred embodiments, the instructions include IF or LOOP instructions. An If instruction includes a condition and action. The condition is evaluated and, if found to be true, the action is performed in the template. A LOOP instruction includes one or more indexed names or name arrays. The indexed names are sequentially processed and the values corresponding to the names in the data source are inserted at the location of each name in the LOOP. The flow directives may contain other types of instructions, as will be recognized by those skilled in the art.

The data source may comprise any conventional type of database and database management system, provided the content stored in the database represents or is reducible to name/value pairs. When the content is reducible to name/value pairs, the method involves reducing the first content to the name/value pairs and storing the name/value pairs in a container class or object. Alternatively, the data source itself may be a container in which the content is already stored in name/value pairs.

In accordance with the further aspects and objects of the invention, a method is described herein for, in response to a request from a client computer for a document, automatically providing a document which is compatible with the client computer's browser type. The method involves storing on the web server a plurality of document templates compatible with a plurality of types of web browsers, automatically identifying at the web server the type of browser operating on the client computer, and selecting one of the plurality of document templates to be populated which is compatible with the client computer's browser type. This method may be used for both dynamic document templates as well as for standard, static web pages.

In preferred embodiments, the step of automatically identifying the browser type comprises reading a browser signature after receiving the client computer's request for the document. A signature table or registry may be stored on the web server linking browser signatures with associated document file extensions. The step of selecting one of the documents comprises looking up in the signature table the read browser signature, finding a document file extension associated with the read signature, and selecting a document having the found file extension.

In accordance with still further aspects of the invention, a method is described for automatically inheriting templates within a directory structure on the web server. The method involves designing and storing a plurality of document templates on the web server in a hierarchical directory structure, each document template corresponding to one of a plurality of possible documents which may be requested by users. When a request is received which includes a locator such as a URL identifying a directory and the requested document, the directory identified in the locator is searched for a first default document template corresponding to the requested document. If the first default template exists in the directory, it is selected for use as the document template. If no first default template exists in the directory, the path is changed to a directory which is one level higher than the directory in the hierarchy for a second default template, that is, to the parent directory. If a second default template exists in the parent directory, it is selected for use as the document template. If the second default template does not exist in the parent directory, the two previous steps of changing the path and searching the new directory are repeated until a default template is found or until the highest level directory has been searched. As a result, web site developers and publishers using the template scheme of the present invention will not be required to design and store templates for every conceivable path in the directory, but may rather design only a limited number of templates which are used in a number of circumstances.

A system according to the present invention comprises a data source stored on the web server containing first content in a form representing or reducible to pairs of names and corresponding values and document templates stored on the web server having second content arranged therein and markers embedded therein. The markers include dynamic tags and flow directives with IF, LOOP, or other instructions and content names as environmental variables. The system further includes means such as a communication link and web server management software for receiving at the web server a request issued by the client computer for the web page document. One or more scripts stored and operating on the web server perform the steps of retrieving at least some of the first content from the data source, selecting one of the templates, and populating the selected template to produce the document.

Some or all of the objects of the invention are also achieved by a method of modifying a markup language document such as a HTML document to provide dynamic embedded content in a world wide web page produced from the document. The method comprises storing content in a form representing or reducible to a plurality of names and corresponding values, inserting into the markup language document dynamic content tags comprising one or more first control symbols and at least one content name, and inserting into the markup language document dynamic flow directives comprising one or more second control symbols, one or more if or loop instructions, and one or more content names as arguments for the one or more if or loop instructions.

Some or all of the objects of the invention are also achieved by a method for delivering documents having dynamic content embedded therein over an internet. The method comprises storing a data source on a server computer connected to the internet, the data source containing content in a form representing or reducible to names and corresponding values, creating document templates by embedding dynamic tags and flow directives in documents, the dynamic tags and flow directives comprising at least in part one or more names of content stored in the data source, storing the document templates on the server computer, in response to receipt by the server computer of a request from a client computer connected to the internet, the request identifying a desired document, performing the steps of selecting a document template corresponding to the desired document, populating the document template with content stored in the data source based on respective values of content corresponding to names in the dynamic tags and flow directives, and delivering the populated document to the client computer.

BRIEF DESCRIPTION OF THE DRAWINGS

The invention is illustrated in the figures of the accompanying drawings which are meant to be exemplary and not limiting, in which like references refer to like or corresponding parts, and in which:

FIG. 2 is a source file for a sample template designed in accordance with the present invention;

DETAILED DESCRIPTION OF THE PREFERRED EMBODIMENTS

Figure 1:
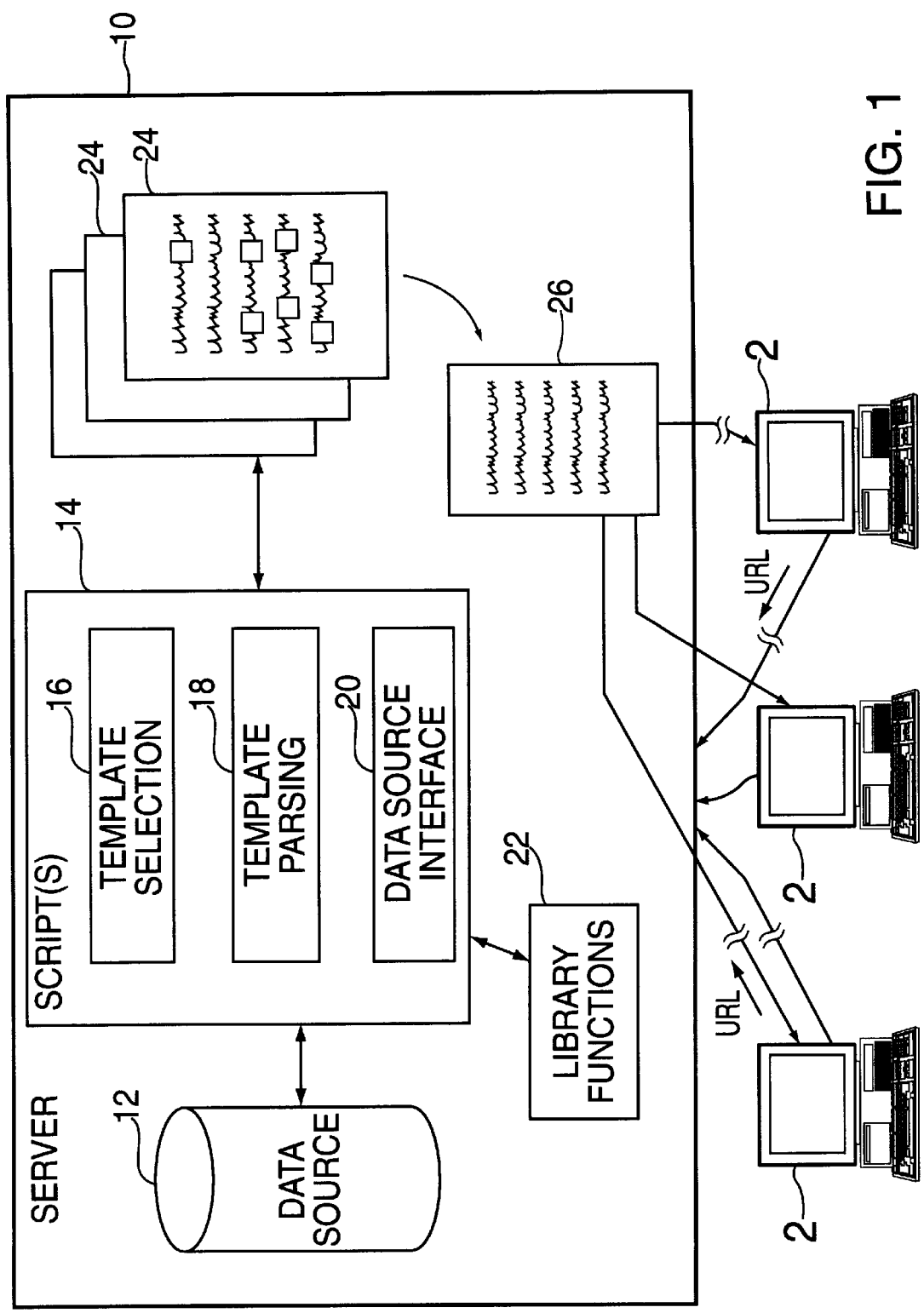
FIG. 1 is a block diagram showing a system for creating, storing, populating and delivering documents having dynamic content embedded therein in accordance with one embodiment of the present invention.

The system of one preferred embodiment of the present invention is shown in the block diagram in FIG. 1. The system comprises a web server 10 which is a computer system including one or more processors, volatile and non-volatile memory devices, and input and output devices, upon which is operating web server software, such as Netscape Commerce Server available from Netscape Communications or one of many available server software packages which may be downloaded from the Internet. On the web server 10 are stored a data source 12 and a script 14 containing a number of functions including a template selection function 16, a template parsing function 18, and a data source interface function 20. The script 14 can be implemented in any programming language, though an object-oriented programming language such as C++ is preferred.

The web server also stores a library of functions 22 which are called by the script 14, and a plurality of document templates 24. The template selection function 16 selects one of the templates 24 to be used based at least in part on the URL received at the web site, and the template parsing function 18, in conjunction with the library functions 22, populates the selected template to produce a document 26 to be sent to a client. Each of these components of the system and their functionality will be described in more detail below.

A communication connection is established between the web server 10 and client computers 2, either via direct links or via indirect links over the Internet. The client computers 2 send URLs requesting particular documents or pages from the server 10, and the server responds by delivering the documents or pages to the clients 2. The manner of communication between clients and servers over the Internet, including over the web, is well known in the art and does not require further elaboration herein.

The data source 12 is stored in non-volatile memory on the web server 10. Alternatively, the data source 12 may be stored on another computer to which the web server 10 has access. In some embodiments, the data source 12 is a relational database and includes a database storing content to be inserted into the templates 24 and a database management system for creating database structures, declaring data relationships, and performing database operations. Alternatively, the data source 12 may include a database in conjunction with a proprietary search engine.

Regardless of its particular structure, the data stored in the data source 12 directly represents or is reducible to name/value pairs. Every item in the data source 12 is or can be represented by a name or variable and a value corresponding to the name. For example, a data source 12 storing order and account information for users who purchase items from a merchant operating a web site can include names such as User_Id (storing a unique identifier for each user who registers with the web site), aOrder_Date, aOrder_Id, aTotal_Due, Account_Balance, etc., and values, if any, corresponding to these names. Some names, such as aOrder_Date and aOrder_Id, represent multiple indexed names or single or multi-dimensional arrays, and can thus take on multiple values.

In preferred embodiments, the data source interface function 20 retrieves content from the data source 12 and stores the content in a container class as a pool of name/value pairs. A container class or container is an object in which data is stored for use by an object oriented system, and is well known in the art. Using the sample names given above, the data source interface function 20 retrieves from the data source 12 the value of the User_Id based on the identity of the user or client 2, retrieves the names and corresponding values for any other names which are linked to the User_Id name in the data source 12, and stores these name/value pairs in the container. Thus, if the identified user 2 has placed a previous order with the merchant operating the web server 10, the data source interface function 20 retrieves the names and corresponding values of aOrder_Date, aOrder_Id, aTotal_Due, etc. associated with the user 2 and stores those names and values in the container.

The web page templates 24 stored on the web server 10 are markup language documents containing a number of dynamic content tags 34 and flow directives 36 embedded therein. In the preferred embodiments the documents are encoded in HTML, which is currently compatible with a broad range of browsers. In a manner similar to the placement of HTML tags in a document, a control symbol is placed before and after each dynamic tag 34 and flow directive 36 to identify it as such. In preferred embodiments of the invention, the control symbol is the symbol "@", though one skilled in the art will clearly recognize that any symbol may be used as a control symbol provided it is distinguishable from symbols used to identify existing HTML tags.

The source file for the sample template 24 shown in FIG. 2 is helpful in illustrating the present invention. As with conventional HTML documents, the template 24, titled ListOrders.tem (the filename extension .tem being used to identify it as a template), contains text 30 and standard HTML tags 32 including character and paragraph formatting tags (such as <head>, <body>, <font>, <center>, and <table>), tags to produce a form to be completed by a user (including the tags <form>, <select>, <input>, and <option>), anchors for hyperlinks (represented by a tag in the form <a href=URL><text or image to be linked></a>), and image insertion tags (represented by a tag in the form <img src="path/filename.gif">).

In accordance with the invention, the template 24 also contains a dynamic tag 34 (such as @(User_Id@) and several flow directives 36a–36c (such as @if month=Jan@SELECTED@end@ and @loop@ . . . @/loop@). Any number of dynamic tags and flow directives may be placed within a template 24, and they may be embedded anywhere in the template 24, including within text 30, within HTML tags 32, and within other flow directives. The placement of one flow directive 36 within another results in a nested flow directive structure. In preferred embodiments, the system supports two types of flow directives 36—IF and LOOP instructions. One skilled in the art will recognize that many other types of flow directives may be supported in accordance with the invention, including do-while, case, and for instructions.

The following logic underlies the dynamic tags and flow directives as interpreted by the script 14 and library functions 22 in preferred embodiments of the invention: Given a pool P of name/value pairs retrieved from the data source 12 and stored in the container, define V(name)=the value corresponding to name for all names in P. The dynamic content tag and flow directive logic is then:

for a dynamic content tag: @name@ outputs V(name) into the template 24;

for an IF instruction in a flow directive:
@if condition@X@end@ tests whether condition is TRUE and if so outputs X into the template 24, where:

| a condition having the form: | is TRUE when: |
|---|---|
| name | name ∈ P |
| name=target | V(name)=target |
| name!=target | V(name)≠target | for a LOOP instruction in a flow directive 36:

@loop@Z@nameX@nameY@@/loop @ outputs into the template 24 ZV(nameXi)V(nameYi), where i goes from 0 to min{j |nameXj ∉ P and nameYj ∉ P}; Z represents a constant, text, or HTML tags; and any number of names may be inserted in the LOOP instruction, with the above instruction illustrating an example of two such names, nameX and nameY.

In the preferred embodiments, the names in the LOOP instruction are retrieved from the data source 12 and stored in the container as an index of names, e.g., nameX0, nameX1, . . . , nameXn. During execution of the LOOP instruction, the index is traversed sequentially to retrieve the series of values. Alternatively, the names in the LOOP instruction can be represented as arrays, with the values being sequentially incremented through the use of well-known techniques such as array indexing or pointer arithmetic.

Applying the logic set forth above to the sample template 24 shown in FIG. 2, the dynamic tag 34 @User_Id@ is replaced with the value of the name User_Id stored in the container. When processed by the client's browser, the use of the <title>and </title> HTML tags produces a title containing the value of the name User_Id and the additional text 30 within the <title> tags. The series of flow directives 36a containing IF instructions within <option> HTML tags output the strings "SELECTED" into the template 24 whenever the name month in the container has a value corresponding to the respective target in the <option> tag, i.e., Jan, Feb, etc. As a result, the form created in the document highlights the options which have been SELECTED as default selections.

Continuing with FIG. 2, the flow directive 36b containing an IF instruction and the name aOrder_Date0 performs the actions within the IF instruction if the container contains a name aOrder_Date0, i.e., if this user has previously ordered merchandise at this web site. The actions to be conditionally performed in this instruction include formatting and inserting a table (per the <table> and subsequent HTML tags and text) displaying the user's orders by Order Date and Total amount due. The table is filled with data particular to this user by virtue of the flow directive 36c containing a LOOP instruction nested within the IF instruction flow directive 36b. The three names whose values are retrieved from the container and inserted into the template are aOrder_Id, aOrder_Date, and aTotal_Due.

Within the LOOP instruction in flow directive 36c are one or more anchors which create hypertext links from the aOrder_Date value(s) retrieved from the container. The anchors point to a gateway script in the form of an executable library module OrderDetail.dll contained in the path oasis/bin on the web server 10. The values for the name aOrder_ld as retrieved from the container by the LOOP instruction are the environment variables passed to the gateway script. When a given one of the hyperlinked aOrder_Date values is selected by the user viewing the populated document, the gateway Script returns another document containing an order record based on the order id number specified by the value of the name aOrder_Id which corresponds to the aOrder_Date value clicked on by the user. The use of gateway scripts to process user input on the web is well-known in the art and no further elaboration herein is required.

Further varying uses of dynamic content tags and flow directives in accordance with the present invention are illustrated by an additional web page template account.tem which is contained in the Appendix attached hereto and forming part of this application.

Figure 3A:
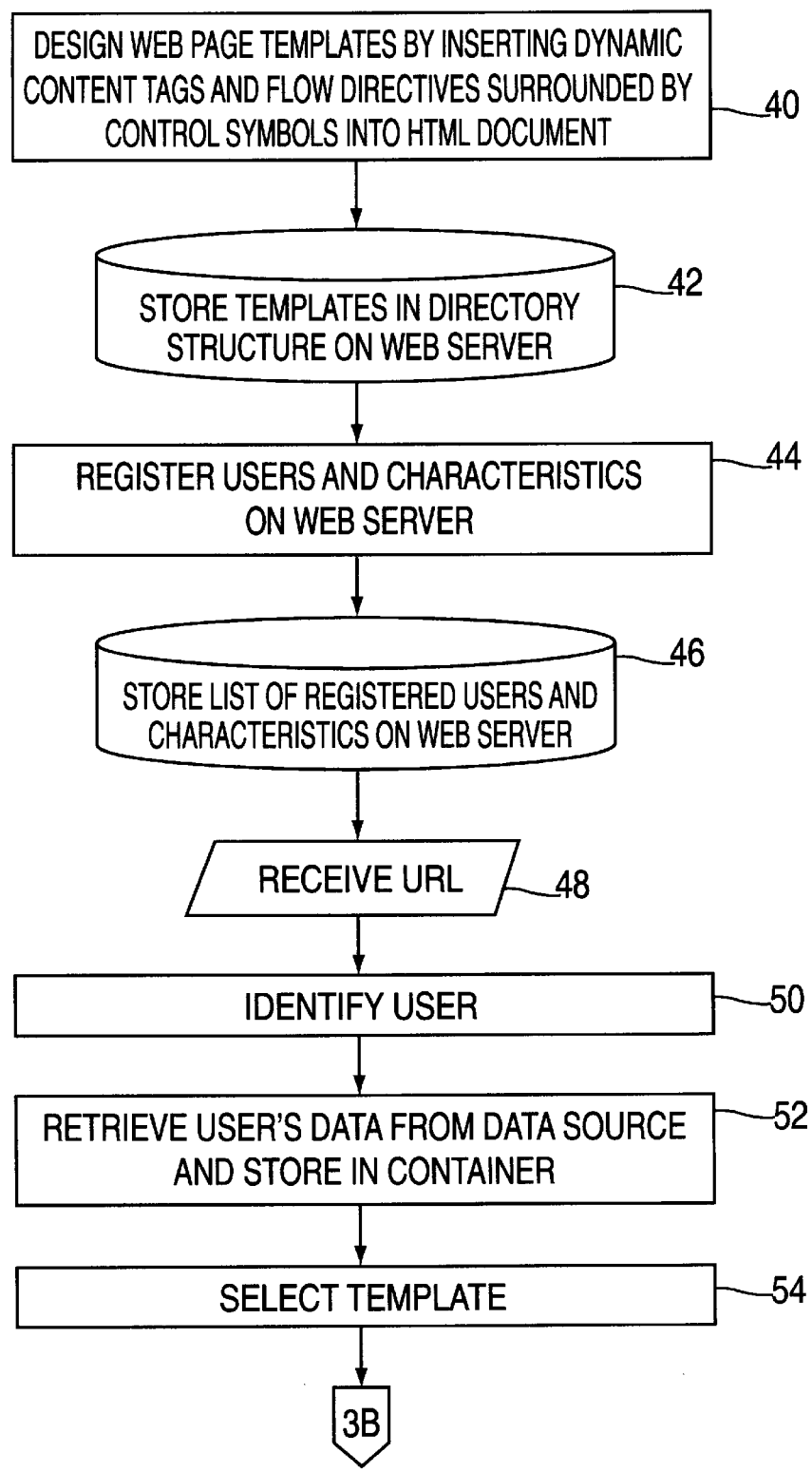
FIG. 3 including 3A–3C is a flow chart showing the process of creating, populating and delivering documents having dynamic content embedded therein in accordance with one embodiment of the present invention.
Figure 3B:
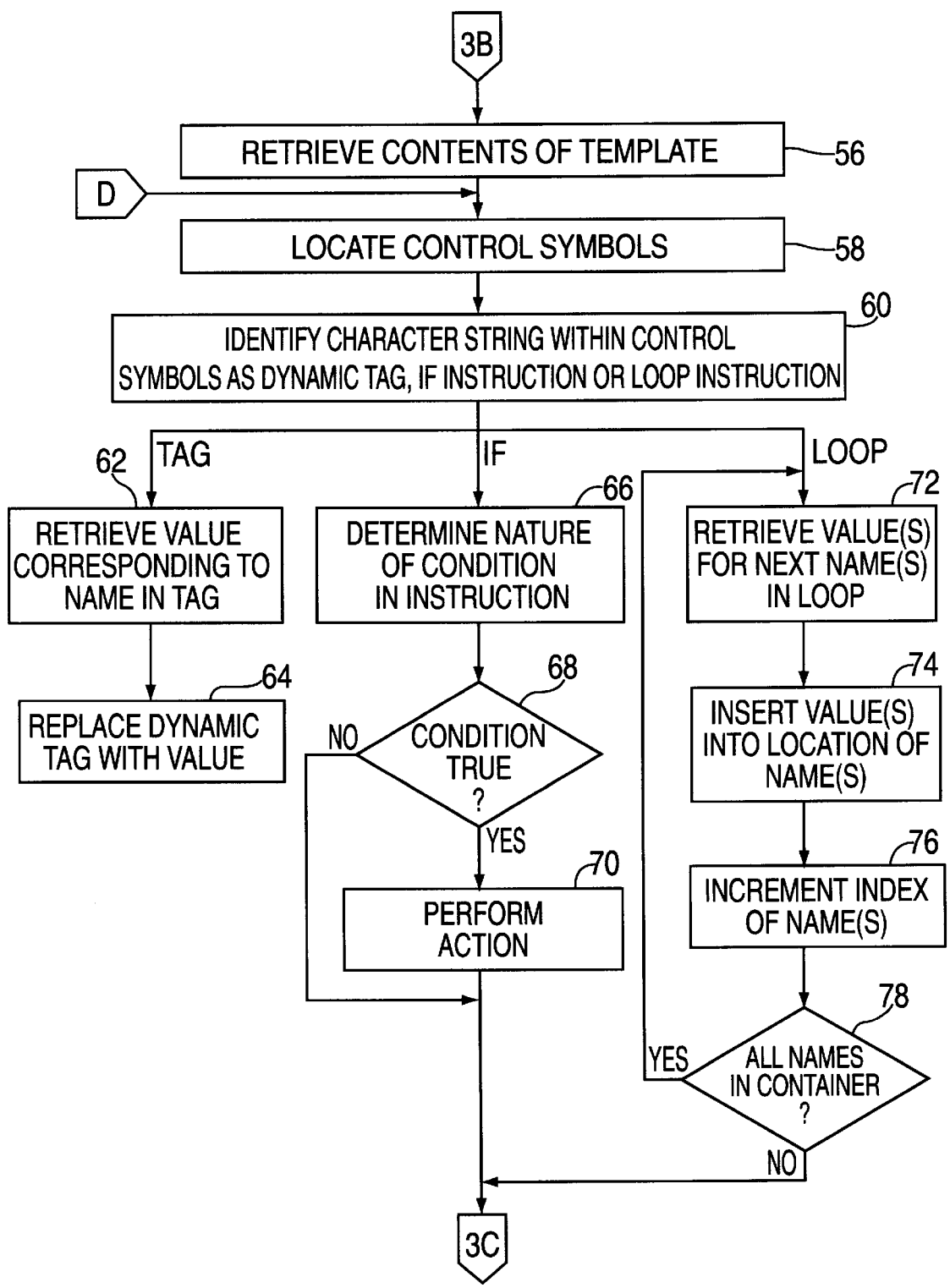
Figure 3C:
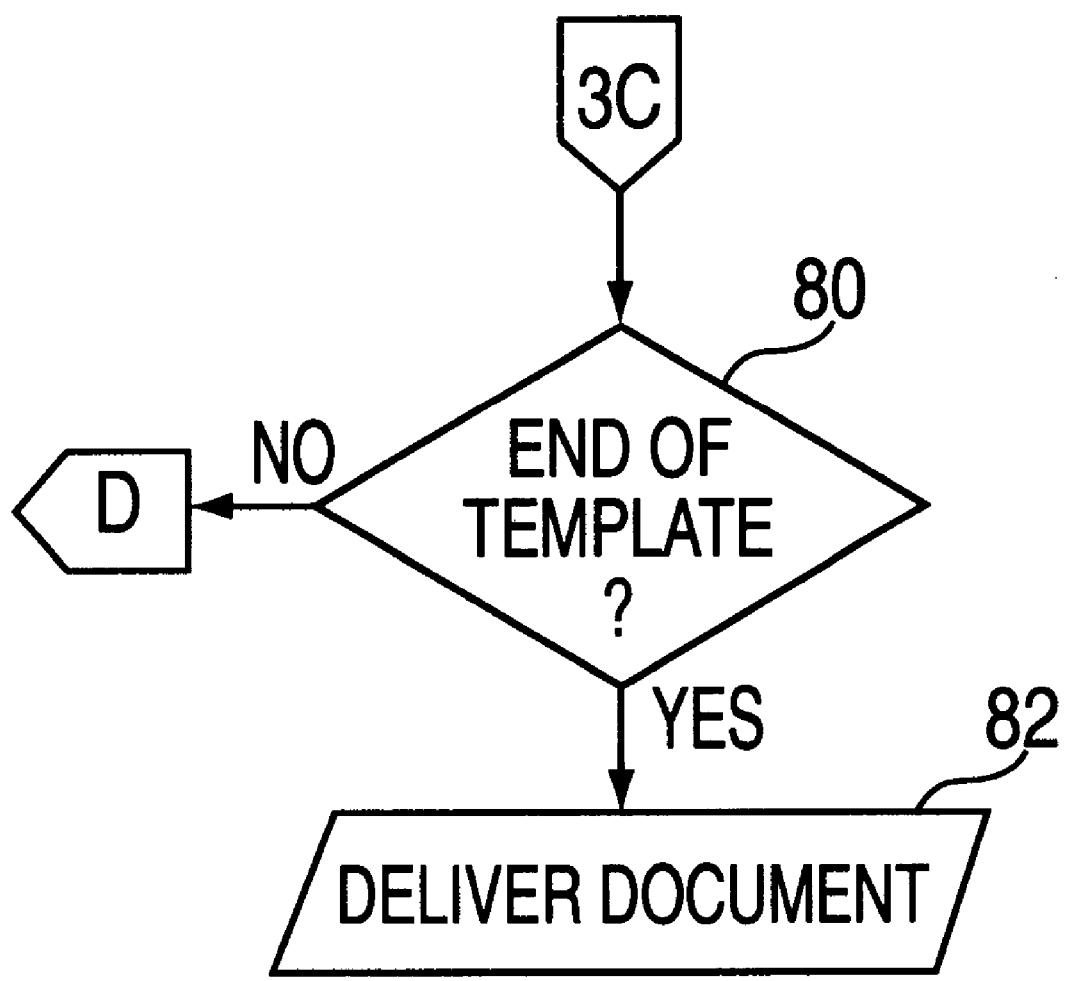

The process of utilizing the system to design and populate templates is shown in the flow chart in FIG. 3. The web site developer designs templates, step 40, by designing HTML documents in the normal manner, i.e., by inserting text and HTML tags or by using an HTML editor such as HotDog available from Sausage Software, and by inserting one or more dynamic content tags and flow directives at desired places having content names corresponding to names available in the data source 12. The templates may be assigned filenames with extensions .tem, and are saved and stored in various directories on the web server, step 42.

Users who visit the web site are invited or required to register and provide additional characteristics or information, step 44, such as address, e-mail address, credit card information, interests, etc. Web sites can also allow users to register as being part of a particular group of users, such as part of a corporate entity, price club, or other organization which is entitled to discounted prices. As a result, web sites can offer special, customized prices to a user in a manner which is transparent to the user. A list of registered users and their relevant characteristics is stored on the web server, step 46.

When the web server receives a URL request for a document, step 48, the user issuing the request is identified, step 50, either by retrieving the user's Internet address from the URL request or having registered users log in. The script 14 then retrieves from the data source 12 data relating to the identified user and stores the retrieved data as name/value pairs in the container class, step 52. The script 14 also selects a template based at least in part on the document requested in the URL, step 54. For example, if the URL contains a request for a web page located in a given directory path and having a filename account.htm, the template account.tem in the given directory path is selected.

As explained further below with reference to FIGS. 5 and 6, in preferred embodiments the process of selecting a template involves the additional processes of automatically sensing the type and version of browser being used by the client to select a compatible template and inheriting templates within the directory structure.

Figure 4:
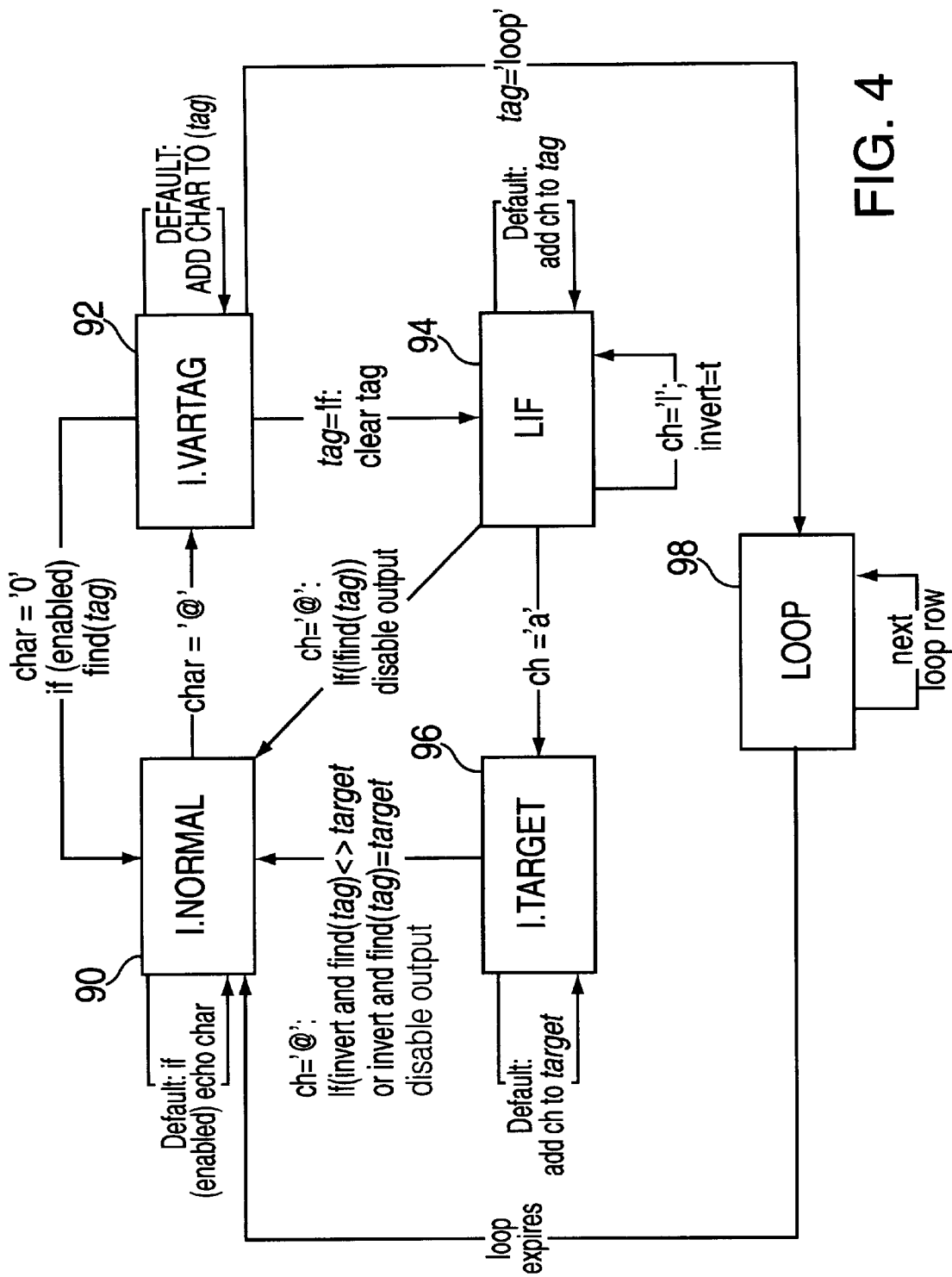
FIG. 4 is a finite state diagram showing template parsing states and their relationships for the template parsing function in accordance with one embodiment of the present invention.

The contents of the selected template are then retrieved, step 56, either all at once or by loading sections of the template sequentially into a buffer. The template parsing function 18 then reads the contents of the template to locate the "@" control symbols, step 58, and identifies the character string surrounded by the control symbols as a dynamic tag, IF instruction or LOOP instruction, step 60. As explained further below, FIG. 4 represents parsing states used in one embodiment of the invention by the template parsing function 18 to keep track of control symbols and the nature of character strings within the control symbols.

For a dynamic tag, the template parser 18 calls the appropriate library function 22 to retrieve the value corresponding to the name in the tag from the container, step 62, and replace the dynamic tag, including the name and control symbols, with the value retrieved from the container, step 64. For an IF instruction, the template parsing function 18 determines the nature of the condition, step 66, and calls an appropriate library function to test whether the condition is TRUE, step 68, and to perform the action specified in the IF instruction only if the condition is TRUE according to the logic set forth above, step 70, by replacing the IF instruction including the control symbols with the appropriate output.

For a LOOP instruction, a library function is called to retrieve from the container the values of the names passed in the LOOP, step 72, and insert the retrieved values into the template 24 at the respective locations of the names and control symbols in the LOOP instruction, step 74. The indexes of the names are then incremented, step 76. If all the new names with increased index values are in the container, step 78, the LOOP returns to the steps of retrieving the values for the new names and inserting the values into the template 24. When one of the names in the LOOP is no longer available in the container, the LOOP is completed.

If the end of the template is reached, step 80, the template has been completely populated and is delivered to the user, step 82. Otherwise, control returns to the step of finding any remaining dynamic tags or flow directives by locating the next control symbols, step 58.

By virtue of the present invention, the document delivered to the user contains content arranged in an attractive, effective manner and which is specific to the user's interests or which provides the user with customized information regarding the user's relationship with the web site manager.

FIG. 4 is a simplified finite state diagram or automaton illustrating parsing states or modes enumerated by the template parsing function 18 in identifying the nature of the character strings as dynamic tags or flow directives. As shown in the diagram, the parsing modes include LNORMAL 90 representing normal text or HTML tags being read, LVARTAG 92 representing a dynamic tag or instruction being read, LIF 94 representing an IF instruction being read, LTARGET 96 representing a target of an IF condition being read, and LOOP 98 representing a loop being processed. As one skilled in the art will recognize, further more detailed modes may be used to process characters within a LOOP instruction.

FIG. 4 also shows the conditions which cause the parsing function 18 to alternate between the modes. As the function 18 sequentially reads the characters (abbreviated in FIG. 4 as "ch" or "char") in the template 24, it determines which mode to enter based on the character(s) read and places the characters into a character string variable such as tag (representing a dynamic tag or instruction) or target (representing the target of a condition in an IF instruction).

The default for any mode is generally to continue outputting characters into the document 26 or reading characters into the variable being processed. The exception is in mode LNORMAL 90, in which output must be enabled in order to continue echoing characters into the document 26. Output becomes disabled when a condition in an IF instruction is determined to be false.

When the "@" control symbol is found while in mode LNORMAL 90, the parsing function 18 switches to mode LVARTAG 92 and continues placing subsequent characters into the variable tag. If another "@" control symbol is found without encountering an IF or LOOP instruction, the tag represents a dynamic tag, and a library functionfind( ) is called to retrieve from the data source 12 and return to the document 26 the corresponding value for the content name in the dynamic tag.

When an IF instruction is found in the tag, the parsing function 18 switches to mode LIF 94, clears the characters "if" from the variable tag, and continues by placing subsequent characters into the variable tag. If another "@" symbol is found without first encountering an "=" sign, the IF instruction is simply testing whether the content name is within the pool of name/value pairs. In accordance with the logic set forth above, the functionfind( ) is called to determine whether the content name exists in the pool and, if it does not, the output in the IF flow directive is disabled. The mode is then switched to LNORMAL 90, which only echoes subsequent characters to the document 26 when output is enabled.

As shown by the logic above, the presence of a "!" symbol read while in mode LIF 94 indicates that the IF instruction is testing whether the value of a content name is not equal to a specified target. When a "!" symbol is found, a logical variable invert is set to a value of TRUE.

When an "=" sign is found while in mode LIF 94, the parsing function 18 switches to mode LTARGET 96, and continues by placing subsequent characters into the variable target. The end of the target of the IF instruction is reached when the "@" symbol is read, in which case the find( ) function is called to retrieve from the container the value for the content name stored in the variable tag and this value is compared to the target stored in the variable target. If the condition is not TRUE, output is disabled; otherwise, output remains enabled. The mode is then returned to LNORMAL.

When a LOOP instruction is found, the parsing function 18 enters the mode LOOP 98 and processes the LOOP instruction in a manner similar to the processing of a dynamic tag and IF instruction as explained herein.

As mentioned above, in preferred embodiments of the present invention, the process of selecting templates involves performing additional steps to achieve certain advantageous results. To provide customized documents which are automatically compatible with the user's browser type, a number of templates are designed and stored which provide the same or similar content but which are designed to be compatible with different browsers. The different browsers have the same filename but different extensions which are indicative of the type of browser they support, e.g., N20 for Netscape version 2.0, N30 for Netscape version 3.0, etc.

Figure 5:
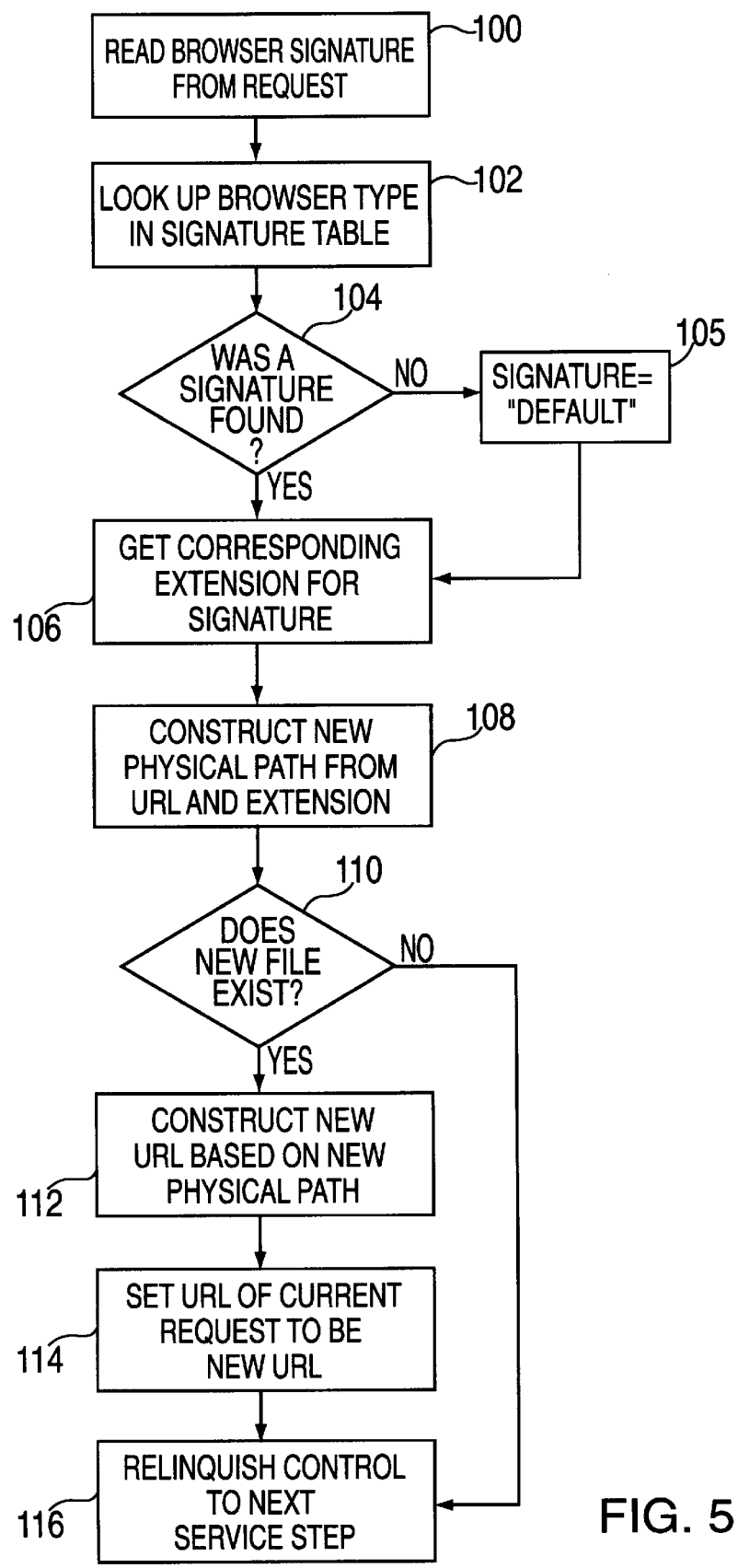
FIG. 5 is a flow chart showing the process of automatically sensing a browser type and delivering a document compatible therewith in accordance with one embodiment of the present invention.

Referring to FIG. 5, when a URL request is received, the browser signature is read from the request, step 100. The signature is then looked up in a browser signature table, step 102, which is a registry of browser signatures and corresponding filename extensions and which includes an entry for a default browser type. If a signature is found in the signature table, step 104, the filename extension corresponding to the signature is retrieved, step 106. If no signature is found in the signature table, then the signature is set to the default signature, step 105, and the filename extension for the default signature is retrieved, step 106. The extension retrieved is then combined with the URL to construct a new physical path, step 108. For example, if the URL specified a path/document of oasis/templates/account.htm, and the browser signature read from the request was Mozilla/2 representing Netscape Navigator version 2.0, a filename extension of N20 is retrieved from the signature table and a new physical path is constructed of oasis/templates/account.N20.

The newly constructed physical path is then used to determine whether a template file exists for the browser, step 110. If no file is found, the original URL is not changed and template selection control is then relinquished to the next service step, step 116. In that case, the default template is used. If a file is found to exist at the newly constructed path, a new URL is constructed based on the new path, step 112, the new URL is substituted for the original URL in the current request, step 114, and control is then relinquished to the next service step, step 116.

As a result of this process, the web site manager can design a single template in as many variations as desired to automatically and transparently support multiple browser types without the need for users to select a given page for their browser. As one skilled in the art will recognize, this browser autosense process can also be utilized with conventional, static web pages. However, when used with the other aspects of the present invention, it provides an even greater level of customization in responses to user requests.

Figure 6:
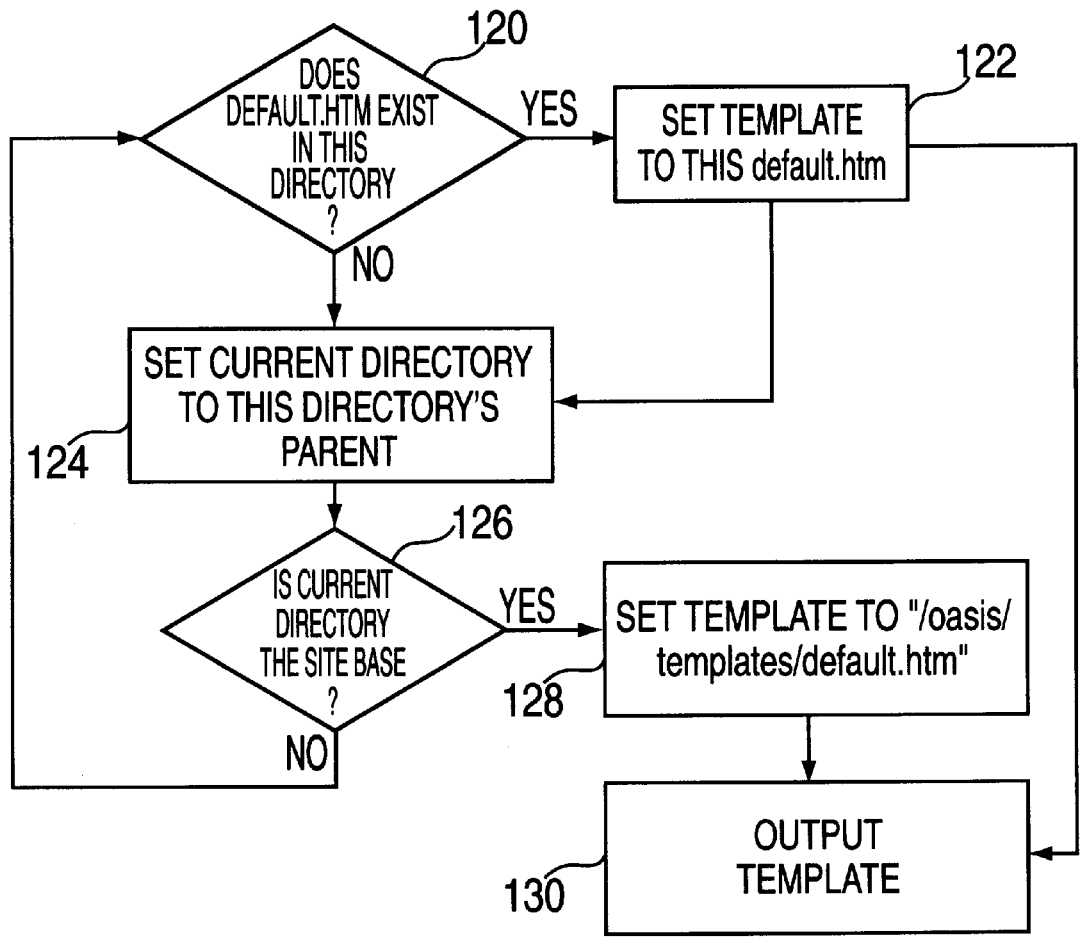
FIG. 6 is a flow chart showing the process of document template inheritance in accordance with one embodiment of the present invention.

One preferred embodiment of the template inheritance process is shown in FIG. 6. In accordance with this aspect of the invention, a template is designed for displaying particular information such as a listing of products, availability, and prices. For users interested in only specific products, no new template need be designed; instead, the template designed for the general product/price listing is inherited to display the specific products of interest. For example, for a web site distributing computer related products, a template designed to show all the products and prices is also used to show just monitors and their prices, or just monitors available from a particular source.

Referring now to FIG. 6, when a URL is received specifying a path and filename (such as http://www.host.com/oasis/computer/monitors/xyzco/prices.htm), the immediate directory of the requested document (in this example directory xyzco) is searched for a default template default.tem, step 120. If the default template exists in the xyzco directory, the default template is set as the selected template, step 122, and is output to the template parser 18, step 130 to be populated in accordance with the invention. If no default template is found in the immediate directory, the current directory is set to the immediate directory's parent, step 124 (in this example, to the directory monitors). If the parent directory is the base directory for the web site, e.g., the home page directory, step 126, the template is set to the default template saved in a template directory, e.g., oasis/templates/default.tem, step 128, which represents a generic template for the web site. This template is then output to be parsed and populated, step 130.

If the current, parent directory monitors is not the site base, the directory is searched for a default template. If a default template exists in the directory, it is set as the template to be output and populated, steps 122 and 130. If no default template exists, the directory is again changed to a directory one level higher in the directory hierarchy (e.g., to the directory computer), step 124. The process continues until a default template is found in a directory or no default template is found and the site base is reached, in which case the generic default template is used.

As a result of this process, templates may be inherited from parent directories to one or more child directories, thus avoiding the need for the web site manager to design and store separate templates.

Although the system and methods of the present invention are particularly useful and advantageous when applied the web, one skilled in the art will recognize that they are applicable to other environments as well, including the transfer of documents via other Internet transfer protocols and even for documents available over intranets or local internets. In accordance with the invention, templates can be used in those and other environments to provide customized, individualized documents from servers to clients in a manner which is transparent to clients.

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

APPENDIX

Account.tem

```
<html>
<!--
            User Account Template
            *****************
            InterWorld Advanced Billing System 1.5
-->
<head>
    <title>@user_id@'s Account</title>
</head>
<form method=post action="/oasis/bin/account.dll">
<body bgcolor=#ffffff>
    <!-- Summary information -->
    <center>
    <table width=90% border=1 cellpadding=0>
        <tr>
        <td>
            <table width=100% border=0>
                <tr>
                    <td colspan=2 align=left>
                        <font size=+2 color=@if status_code=Active@#000099@end@@if status_code=Hold@#990000@end@><b>@account_name@</b></font>
                        @if status_code=Hold@<font color=#990000><b>(ON HOLD)</b></font>@end@
                    </td>
                    <td width=50% align=right>
                        <i>est. @account_date@</i>
                    </td>
                </tr>
                <tr>
                    <td>
                        <select name=period>
```

APPENDIX-continued

Account.tem

```
                <option>Summary
                <option @if period=All Periods@SELECTED@end@>All Periods
                @loop@<option @month_selected@>@month@@/loop@
              </select>
              <input type=submit name="view" value="View Period">
            <td>
<!--
        <tr>
          <td colspan=2>
            @account_description@
          </td>
        </tr>
-->
            <td align=right>
              <i>Balance </i><b>$@account_balance@</b>
            </td>
            @if points_rate@
            <td align=right>
                <i>Points</i>
              <b><font color=#007700>@account_points@</font> ($@account_poin
ts_cash@)</b>
            </td>
            @end@
          </tr>
          <tr>
            <td colspan=3 align=center>
              <a href="/members.htm"><img src="/oasis/images/member.gif" bor
der=0></a>
              @if !credit_card@<a href="/oasis/bin/account.dll?credit_card=t
">@end@
                <img src="/oasis/images/@if !saved_credit_card@crecred.gif@en
d@@if
saved_credit_card@credit.gif@end@" border=0>
              @if !credit _card@</a>@end@
              @if points_rate@
              @if !convert@<a href="/oasis/bin/account.dll?convert=t">@end@
                <img src="/oasis/images/convert.gif" border=0>
              @if !convert@</a>@end@
              @end@
              @if !payment@<a href="/oasis/bin/account.dll?payment=t">@end@
                <img src="/oasis/images/pay.gif" border=0>
              @if !payment@</a>@end@
            </td>
          </tr>
        </table>
      </td>
    </tr>
  <table>
  <center>
  <p>
  @if period=Summary@
  <center>
  <font size=+1 color=#990000>Summary Account Information</font><p>
  <table width=80% border=1>
    <tr>
      <th> </th>
      <th align=center><b>Debit</b></th>
      <th align=center><b>Credit</b></th>
    </tr>
    @if points_rate@
    <tr>
      <td align=right><b>Cash</b></td>
      <td align=right>@cash_debit@</td>
      <td align=right>@cash_credit@</td>
    </tr>
    <tr>
      <td align=right><b>Points</b></td>
      <td align=right><font color=#007700>@points_debit@</font> (@point
s_debit_cash@)</td>
      <td align=right><font color=#007700>@points_credit@</font> (@poin
ts_credit_cash@)</td>
    </tr>
    @end@
    <tr>
      <td align=right> @if points_rate@<b>Total</b>@end@</td>
      <td align=right>$@debit_total@</td>
      <td align=right>$@credit_total@</td>
```

APPENDIX-continued

Account.tem

```
        </tr>
        <tr>
          <td align=right><b>Overall Balance</b></td>
          <td colspan=2 align=right><b>$@overall_balance@</b></td>
        </tr>
      </table>
    </center>
    <p>
@end@
@if period@
@if period!=Summary@
    <font size=+1>Account Transactions for </font>
    <font size=+1 color=#990000><b>@period@</b></font>
<hr>
    <table width=100% cellpadding=0>
      <tr>
        <th align=left><b>Date</b></th>
        <th align=left><b>Description</b></th>
        <th align=left><b>Detail</b></th>
        <th align=right><font color=#990000><b>Debit</b></th>
        <th align=right><b>Credit</b></th>
      </tr>
      @loop@
      <tr>
        <td align=left><font size=-1><i>@trans_date@</i></font></td>
        <td align=left><font size=-1>@trans_desc@</font></td>
        <td align=left><font size=-1 color=#000099>
          @if order_id@<a href=/oasis/bin/orderdetail.dll?orderid=@order_i
d@>@end@
          @trans_detail@
          @if order_id@</a>@end@
        </font></td>
        <td align=right><font size=-1 color=#990000>@trans_debit@</font><
/td>
        <td align=right><font size=-1>@trans_credit@</font></td>
      </tr>
      @/loop@
      <tr>
        <td></td><td></td><td></td>
        <td align=right><font size=-1 color=#990000><b>$@debit_total@</b>
</font></td>
        <td align=right><font size=-1><b>$@credit_total@</b></font></td>
      </tr>
    </table>
@end@
@end@
@if convert=t@
  <center>
  <font size=+1 color=#007700>Convert points to cash</font>
  <p>
    <table border=1 cellpadding=3>
      <tr>
        <td align=center><b>Points to convert</b></td>
        <td align=center><input type=text name="points" value="0" size=8
></td>
<td align=center><input type=submit value="Convert"></td>
      </tr>
    </table>
  <center>
    @end@
    @if payment=t@
      <center>
      <font size=+1 color=#770077>Account Payment Configuration</font>
      <p>
      <table border=1 cellpadding=10>
        <tr>
          <td>
            <input type="radio" name="payment_method" value="BILL_MAIL" @if
payment_method!=CREDIT_SAV@CHECKED@end@>
              Send me monthly bills in the mail to my <a href="/oasis/bin/pro
file.dll">billing address</a>.
            @if saved_credit_card@
            <br>
            <input type="radio" name="payment_method" value="CREDIT_SAV" @if
payment_method=CREDIT_SAV@CHECKED@end@>
              Bill my <a href="/oasis/bin/account.dll?credit_card=t">saved cr
edit card</a> monthly.
```

APPENDIX-continued

Account.tem

```
                <center>
                <input type="submit" name="set_payment" value="Set payment metho
d">
                </td>
            </tr>
            <tr>
                <td align=center>
                    Make a payment now with my <a href="/oasis/bin/account.dll?credi
t_card=t">saved credit card</a>:
                    <center>
                    <b>Amount: $</b> <input name="payment_amount" size=8>
                    <input type="submit" name="make_payment" value="Make payment">
                @end@
                @if !saved_credit_card@
                    <p>
                    You don't have a credit card on record.<br>
                    <a href="/oasis/bin/account.dll?credit_card=t">Adding a saved cr
edit card</a> enhances your
payment options.
                @end@
                </td>
            </tr>
            </table>
            </center>
        @end@
        @if credit_card=t@
            <center>
            <font size=+1 color=#CC7700>
                @if !credit_card_name@Create@end@@if credit_card_name@Update@end@
Saved Credit Card
            </font>
            <p>
            <table border=1 width=80%>
                <tr>
                    <td>
                        <table border=0 width=100%>
                            <tr>
                                <td align=right width=50%><i>Card Type</i></td>
                                <td>
                                    <SELECT NAME="credit_card_type">
                                        <OPTION @if credit_card_type=Visa@SELECTED@end@>Visa
                                        <OPTION @if credit_card_type=Master Card@SELECTED@end@>Mast
er Card
                                        <OPTION @if credit_card_type=American Express@SELECTED@end@
>American Express
                                        <OPTION @if credit_card_type=Discover Card@SELECTED@end@>Di
scover Card
                                    </SELECT>
                                </td>
                            </tr>
                            <tr>
                                <td align=right><i>Name on Card</i></td>
                                <td><INPUT TYPE="text" NAME="credit_card_name" MAXLENGTH="25"
    SIZE="25" VALUE="@if
!credit_card_name@@account_name@@end@@credit_card_name@"></td>
                            </tr>
                            <tr>
                                <td align=tight><i>Credit Card Number</i><td>
                                <td><INPUT TYPE="text" NAME="credit_card_number" MAXLENGTH="2
5" SIZE="25"
VALUE="@credit_card_number@"></td>
                            </tr>
                            <tr>
                                <td align=right><i>Expiration Date</i></td>
                                <td>
                                    <SELECT NAME="card_month">
                                        <OPTION @if card_month=Jan@SELECTED@end@>JAN
                                        <OPTION @if card_month=Feb@SELECTED@end@>FEB
                                        <OPTION @if card_month=Mar@SELECTED@end@>MAR
                                        <OPTION @if card_month=Apr@SELECTED@end@>APR
                                        <OPTION @if card_month=May@SELECTED@end@>MAY
                                        <OPTION @if card_month=Jun@SELECTED@end@>JUN
                                        <OPTION @if card_month=Jul@SELECTED@end@>JUL
                                        <OPTION @if card_month=Aug@SELECTED@end@>AUG
                                        <OPTION @if card_month=Sep@SELECTED@end@>SEP
                                        <OPTION @if card_month=Oct@SELECTED@end@>OCT
                                        <OPTION @if card_month=Nov@SELECTED@end@>NOV
```

APPENDIX-continued

Account.tem

```
                <OPTION @if card_month=Dec@SELECTED@end@>DEC
            </SELECT>
            <SELECT NAME="card_year">
                <OPTION @if card_year=1996@SELECTED⅝end@>1996
                <OPTION @if card_year=1997@SELECTED@end@>1997
                <OPTION @if card_year=1998@SELECTED@end@>1998
                <OPTION @if card_year=1999@SELECTED@end@>1999
                <OPTION @if card_year=2000@SELECTED@end@>2000
                <OPTION @if card_year=2001@SELECTED@end@>2001
                <OPTION @if card_year=2002@SELECTED@end@>2002
            </SELECT>
        </td>
    </tr>
    </table>
    </td>
</tr>
<tr>
    <td align=center height=40>
        <input type="submit" name="save_card"
            value="@if credit_card_number!=@Update@end@@if credit_card
_number=@Create saved@end@ card">
    </td>
</tr>
    </table>
    </center>
    @end@
    <p>
    </form>
    </body>
</html>
```

What is claimed is:

1. A method of a delivering a document customized for a user from a first computer to a second computer comprising:

storing on the first computer a document template having a plurality of markers imbedded therein, each marker being associated with one of a plurality of names;

storing in the first computer a plurality of values, each value being associated with one of said names, each value being assigned to one of a plurality of users;

receiving a request from one user for said document;

identifying said user;

generating said document by retrieving said template and exchanging each said marker with a corresponding value as determined by the name of the marker and the identity of said user; and transmitting said document to said the second computer for said user.

2. The method of claim 1 further comprising storing on the first computer a list of registered users and wherein the step of identifying said user comprises determining the identified user from said list.

3. The method of claim 1 wherein the document is delivered over the global Internet, the first computer is a world wide web server, and the second computer is a client computer upon which a world wide web browser of a particular type is operating, the method further comprising:

storing on the web server a plurality of document templates compatible with a plurality of types of web browsers;

automatically identifying at the web server the type of browser operating on the client computer; and selecting one of the plurality of document templates to be populated which is compatible with the client computer's browser type.

4. The method of claim 3 wherein the step of automatically identifying the type of browser comprises reading a browser signature after receiving the client computer's request for the document.

5. The method of claim 1 wherein the step of storing at least one document template comprises storing a plurality of templates on the first computer in a hierarchical directory structure, each template corresponding to one of a plurality of different documents, and wherein the step of receiving a request for the document comprises receiving a locator identifying a directory and the requested document.

6. The method of claim 5 further comprising:

searching the directory identified in the locator for a first default document template corresponding to the requested document;

if the first default template exists in the directory, selecting the first default template to use as the document template;

if no first default template exists in the directory, searching a directory which is one level higher than the directory in the hierarchy for a second default template;

if a second default template exists, selecting the second default template to use as the document template; and if no second default template exists, repeating the two previous steps in the method until a default template is found or until the highest level directory has been searched.

7. The method of claim 1 wherein said step of generating said document comprises the step of parsing said template to locate said markers.

8. The method of claim 7 wherein each said marker includes one of a variable with a dynamic tag, and a control command.

9. The method of claim 8 wherein each tag identifies one of said values for each user.

10. The method of claim 1 wherein said document is customized by said document's contents, which each document being unique to each particular user.

11. A system for delivering a world wide web page document having dynamic content embedded therein from a web server to a client computer over the global Internet, the system comprising:

a data source stored on the web server containing a list of customers and first content in a form representing or reducible to pairs of names and corresponding values, each customer being associated with one of said pairs;

at least one document template stored on the web server having second content arranged therein and one or more markers embedded therein, the markers including one of:

one or more dynamic content tags including at least one first content name; and one or more dynamic flow directives including one or more instructions and one or more first content names as arguments for the instructions;

means for receiving at the web server a request by the client computer for the web page document by a particular client;

one or more scripts stored and operating on the web server for identifying said client and performing the steps of retrieving at least some of the first content from the data source and populating the at least one document template to produce the document by substituting values corresponding to content names in the one or more dynamic content tags or performing the one or more instructions based on content names in the dynamic flow directives or their corresponding values for said particular customer; and means for transmitting the document from the web server to the client computer.

12. The system of claim 11 wherein the data source comprises a database and wherein the one or more scripts operate to retrieve the first content and store it in a container in name/value pairs.

13. The system of claim 11 wherein the data source is a container in which the first content is stored in name/value pairs.

14. The system of claim 11 comprising a plurality of document templates stored on the web server which are compatible with a plurality of types of web browsers and wherein the one or more scripts perform the further steps of automatically identifying at the web server the type of browser operating on the client computer and selecting one of the plurality of document templates to be populated which is compatible with the client computer's browser type.

15. The system of claim 13 comprising a plurality of document templates stored on the web server in a hierarchical directory structure, each document template corresponding to one of a plurality of different documents, wherein the means for receiving a request for the document comprises means for interpreting a locator identifying a directory and the requested document, and wherein the one or more scripts perform the further steps of:

searching the directory identified in the locator for a first default document template corresponding to the requested document;

if the first default template exists in the directory, selecting the first default template to use as the document template;

if no first default template exists in the directory, searching a directory which is one level higher than the directory in the hierarchy for a second default template;

if a second default template exists, selecting the second default template to use as the document template; and if no second default template exists, repeating the two immediately preceding steps until a default template is found or until the highest level directory has been searched.

16. The system of claim 13 wherein the one or more instructions comprise if or loop instructions.

17. A method of a delivering a document customized for a user from a first computer to a second computer comprising:

storing on the first computer a document template having a plurality of markers imbedded therein, each marker being associated with one of a plurality of names;

storing in the first computer a plurality of values, each value being associated with one of said names;

receiving a request from one user for said document;

generating said document by retrieving said template and exchanging each said marker with a corresponding value as determined by the name of the marker; and transmitting said document to said the second computer for said user.

* * * * *